May 15, 1962     H. S. NATHANSON     3,034,282
TEMPERATURE-CONTROLLED TIMER
Filed July 8, 1958
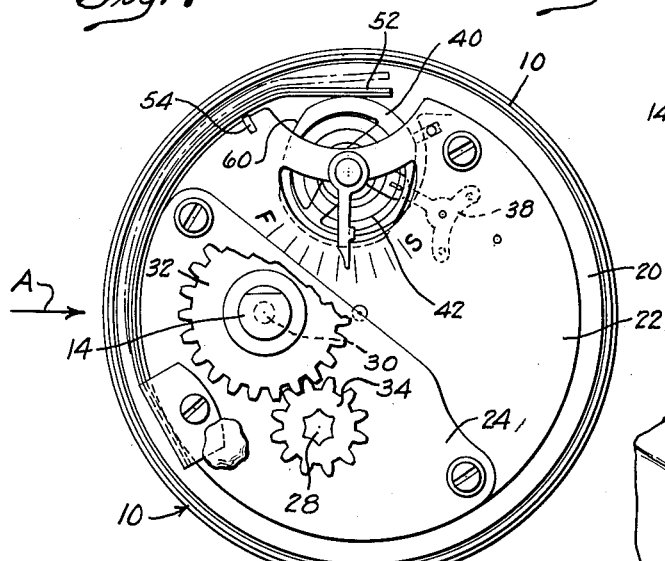
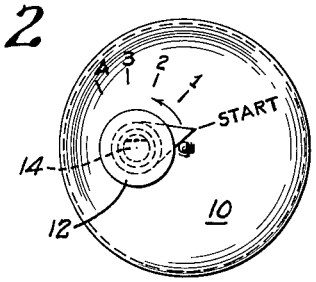
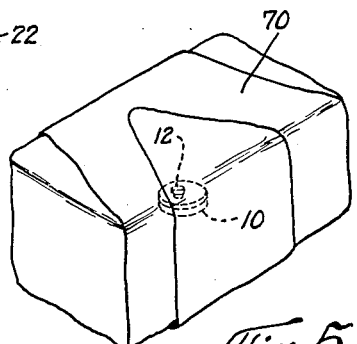
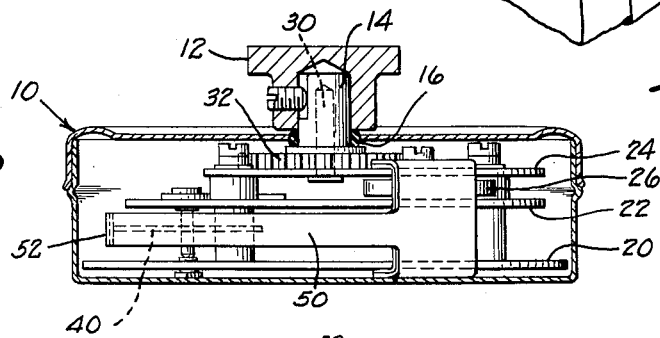
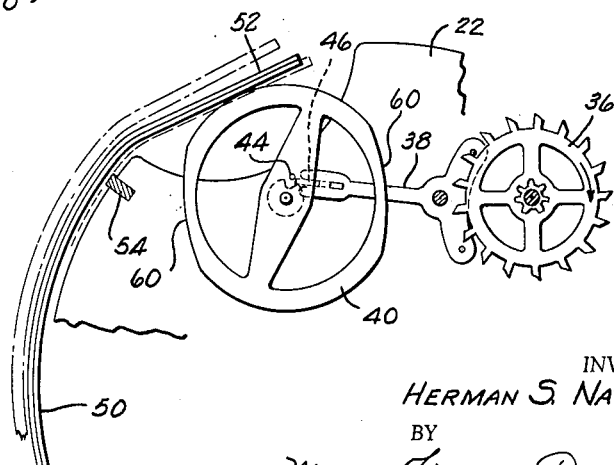
INVENTOR.
HERMAN S. NATHANSON
BY
Morgan, Finnegan, Durham & Pine
ATTORNEYS.

United States Patent Office 3,034,282
Patented May 15, 1962

3,034,282
TEMPERATURE-CONTROLLED TIMER
Herman S. Nathanson, % Scientific Equipment Manufacturing Corp., 838 Broadway, New York, N.Y.
Filed July 8, 1958, Ser. No. 747,281
4 Claims. (Cl. 58—22.9)

The present invention relates to a novel and improved temperature-controlled timer for measuring the period of time during which the timer is at a temperature outside a given range, as well as to a novel sterilized surgical package.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

FIGURE 1 is a top plan view, with certain parts broken away, of a timer in accordance with the present invention.

FIGURE 2 is a top plan view of the timer in its case.

FIGURE 3 is a central sectional view taken on the diametrical line A.

FIGURE 4 is a schematic detail section showing a portion of the preferred embodiment of the present invention.

FIGURE 5 is a perspective view of a sterilized surgical package in accordance with the present invention.

In many operations it is important to know whether or not a given temperature has been exceeded, and for what period of time such condition of excess temperature has existed; and in other instances it is important to know whether an object has been subjected to an excessively low temperature and for what length of time such abnormally low temperature has prevailed. Various means have been proposed for such measurements, but these prior means have either been unreliable in their indication or measurement, or have been so unduly expensive or bulky as to mitigate against their widespread use.

In the sterilization of surgical bandages and instruments, it is important to know that the bandages or instruments have been subjected to a temperature in excess of a predetermined value for a given number of minutes, for example, to temperatures in excess of 250° F. for a period of at least one hour. Also, in connection with the shipment and storage of whole blood to be used for intravenous injection, it is essential to know that the whole blood has not been allowed to warm to temperatures above a predetermined maximum, such as 50° F. for more than twelve hours. In the freezing of foodstuffs, thorough, rapid freezing can be achieved only by subjecting the foodstuffs to temperatures below a given value for a predetermined length of time, which minimum temperature is usually lower than the temperature at which the foodstuffs will eventually be stored.

The present invention has for its object the provision of a novel and improved timing mechanism having a balance-wheel, lever-escapement which is adapted to measure the period of time during which the timer is at a temperature outside of a given range, that is, either above or below a given temperature. A further object is the provision of a simple, reliable, inexpensive mechanism which is adapted to measure such a departure from a given, predetermined temperature range. Still another object is the provision of a temperature control means which can be easily and readily adapted to a conventional form of spring-wound, balance-wheel, lever-escapement timing mechanism. The invention further provides a novel and improved surgical package, comprising bandages, dressings or instruments, which clearly indicates whether or not the package and its contents have been properly processed for a specified, total length of time at a temperature in excess of a specified degree of heat; for instance for a total of one hour at temperatures in excess of 250° F.

In accordince with the present invention, the timing mechanism preferably comprises a modified conventional form of spring-wound timing mechanism having a balance-wheel, lever-escapement including an oscillatory balance wheel, and a thermally-actuated braking member engageable with the balance wheel only in self-starting position to stop oscillation of the balance wheel, the thermally-actuated braking member being moved out of contact with the balance wheel to allow normal oscillation thereof when the temperature departs from the predetermined range. Conventional timing mechanisms are subject to the difficulty and objection that the balance wheel is not always self-starting from a stopped position, as the balance wheel may often stop in a central position where its hair-spring is in equilibrium, and jarring or other vibration, or complex accessory means are needed to start the balance wheel oscillating. In accordance with the present invention, the thermally-actuated braking member, preferably in the form of a thin bi-metal strip, moves into and out of engagement with the periphery of the balance wheel to effect frictional stoppage of the balance wheel, and the balance wheel has its periphery cut away, or relieved, for a short distance so that stopping engagement between the braking member and the balance wheel is prevented when the balance wheel is in a position of equilibrium, and can take place only when the balance wheel is energized by its hairspring for self-starting oscillation. The bi-metal strip is preferably fixedly mounted at one of its ends on the timer frame, while the free end of the bi-metal strip moves radially towards and away from the balance wheel. Means are preferably provided for limiting the movement of the bi-metal strip towards the balance wheel, thereby avoiding damaging excess pressure on the balance-wheel structure. The timing mechanism of the present invention, for many uses, is enclosed within a moisture-proof casing through which projects the shaft by which its main spring is wound, which shaft also serves to carry the indicator member by which the time of running of the timer may be observed.

The present invention also includes a surgical package which comprises a tightly wrapped, pervious fabric enclosure of gauze, muslin or the like, within which is contained a supply of surgical bandages, surgical gauge, or surgical instruments, together with an excess temperature indicator, of the kind described generally above or which may also comprise any other form of temperature-controlled timer which will give a positive indication that the package as a whole has been subjected to temperatures in excess of a predetermined degree for at least a predetermined total period of time; for instance, for one or several periods totaling at least one hour, at temperatures in excess of 250° F. Thus, in the sterilizing autoclave, a positive indication would be produced with temperature variations between 245° F. and 260° F. only if the times at which the temperature exceeded 250° F. totaled at least one hour.

It will be understood that the foregoing general description and the following detailed description as well are exemplary and explanatory of the invention but are not restrictive thereof.

Referring now in detail to the accompanying drawings which illustrate the preferred and illustrative embodiment of the present invention, which is especially adapted to be included within a package of surgical bandages, gauze or instruments to be sterilized. As illustratively embodied, there is provided a casing 10 within which the timing mechanism is contained, except for its combined winding and indicating knob 12 which is fixedly attached to a shaft 14 which projects from the timer through a suitable hole in the casing, and is rendered substantially moisture-proof by means of the gasket 16.

The general structure of the timer may be substantially that of conventional spring-wound, balance-wheel, lever-escapement timers which are in general use and which comprise frame plates 20, 22 and 24, between which and on which are mounted the main spring 26, its winding shaft 28, a stud 30 on which is rotatably mounted the knob shaft 14 and its gear 32 meshing with the pinion 34 on the main spring shaft 28. The intergeared shafts 28 and 14 serve to wind the main-spring powering the timer and also serve to control the movement of the indicating pointer which moves over the scale markings on the upper face of the casing 10.

Driven by the main-spring 26 are the usual intermediate gears (not shown) which rotate under control of the timer escapement wheel 36, while the escapement wheel is controlled by means of the oscillation of a conventional escapement lever or pivoted pallet 38 which is controlled by the oscillation of a balance wheel 40 which in turn is powered by the usual hair-spring 42. Such a balance wheel 40 is in a position of equilibrium, and may be non-self-starting when the guard pin 44 is within the slot 46 at the adjacent end of the pallet lever 38.

A thermally-actuated braking member to prevent running of the timer under normal conditions is provided and is engageable with the balance wheel 40 to prevent oscillation of the escapement, thereby preventing running of the timer. As embodied, an arcuately-shaped strip 50 of bi-metal is mounted on the frame plates at one of its ends and is positioned so that its free end 52 may engage with the peripheral surface of the balance wheel 40. As the temperature, to which the bi-metal strip 50 is heated or cooled, changes, the free end of the bi-metal strip 50 tends to move radially toward or away from the balance wheel and into or out of engagement with the periphery of the balance wheel, thereby braking the balance wheel, or allowing it to oscillate, and thereby controlling the running of the timer. A stop bar 54 mounted between the frame plates 20 and 22 is provided close to the free end 52 of the bi-metal strip so as to limit movement of the free end towards the balance wheel 40, thereby preventing damage to the balance wheel assembly which might otherwise occur if the pressure exerted by the bi-metal strip on the balance wheel became too great.

Where it is desired to measure the total period or periods of time during which the timer has been above a predetermined temperature, the metal on the concave side of the arcuately-bent bi-metal strip 50 will be the metal of greater coefficient of expansion, while periods of abnormally low temperature may be measured if the inner, concave layer of the bi-metal member is formed of metal having the lower thermal coefficient of expansion. Thus, for the measurement of periods of excess temperature the outer layer of metal may be of stainless steel or Invar, while the inner layer may be of brass or bronze.

To avoid stoppage of the balance wheel in a position of equilibrium, so that it would then be non-self-starting, the peripheral portion of the balance wheel 40 engageable with the bi-metal strip 50 is relieved or cut away as at 60 so that the balance wheel during its rapid oscillation is engaged by the free end 52 of the bi-metal strip, as it slowly moves towards the balance wheel. Such engagement will always occur while the balance wheel is to one side or the other of the relieved portion 60, thereby insuring that the balance wheel is always stopped in energized or self-starting position and powered by the hair-spring 42. The degree of energization of the balance wheel as it is stopped is controlled by the extent of the relieved portion 60, and the relieved portion may be extended so long as the unrelieved portions of the balance wheel periphery are engageable with the free end 52 of the bi-metal strip near the ends of its oscillatory positions.

As the free end 52 of the bi-metal strip moves to free the balance wheel 40, the balance wheel immediately begins oscillation and the pointer on knob 12 moves to indicate the length of a period of abnormal excess or low temperature.

The surgical package of the present invention is shown in FIGURE 5 of the present drawings and comprises a substantially pervious wrapper 70. Such a package may include surgical bandages or gauze, or may include the surgical instruments to be used in a given operation. Also included within the package wrapper 70 is a timer of the kind previously described and which will indicate the length of time to which the contents of the package have been subject to sterilizing temperatures in excess of a specified degree of heat. Thus a nurse opening such a package for use in an operation, will first observe the total time indicated by the timer, indicating the total time at which the interior of the package remained at a temperature in excess of the predetermined value, e.g. 250° F., and can reject any package which shows an insufficient time of sterilization. In this manner, there is eliminated the possibility that a supposedly sterilized package is used which had remained in a sterilizer which was faulty in its operation, or which had been improperly controlled.

When a timer of the present invention is included within a surgical package or on a bottle of whole blood, the surgical nurse or surgeon may personally verify that the package and its contents have been properly processed or stored.

The invention in its broader aspects is not limited to the specific mechanisms shown and described but departures may be made therefrom within the scope of the accompanying claims without departing from the principles of the invention and without sacrificing its chief advantages.

What is claimed is:

1. A timer comprising a spring-wound timing mechanism having a balance wheel lever escapement including an oscillatory balance wheel having a null position in which it will not be self-starting, a bi-metallic thermally-actuated braking member movabe into engagement with said balance wheel, said balance wheel being cut-away on its periphery to avoid engagement of said braking member with said balance wheel when said balance wheel is in its null position.

2. A timer comprising a spring-wound timing mechanism having a balance wheel lever escapement including an oscillatory balance wheel having a null position in which it will not be self-starting, and a thermally-actuated braking member movable into engagement with said balance wheel, said balance wheel being cut-away on its periphery to avoid engagement of said braking member with said balance wheel when said balance wheel is in its null position, wherein the thermally-actuated braking member comprises a bi-metal strip having a portion movable radially toward and away from the balance wheel and wherein the bi-metal strip has a free end and a stop limits the movement of the strip towards the balance wheel.

3. A timer comprising a spring-wound timing mechanism having a balance wheel lever escapement including an oscillatory balance wheel having a null position in which it will not be self-starting, and a thermally-actuated braking member movable into engagement with said balance wheel, said balance wheel being cut-away on its periphery to avoid engagement of said balance wheel with said braking member when said balance wheel is in its null position wherein the thermally-actuated braking member comprises a bi-metal strip having a portion movable radially toward and away from the balance wheel.

4. A timer comprising a spring-wound timing mechanism having a balance wheel lever escapement including an oscillatory balance wheel having a null position from which it will not be self-starting and means including a bi-metallic thermally-actuated braking member movable into engagement with the balance wheel to stop said balance wheel in a position other than at its null position and for avoiding engagement of said balance wheel with said braking member when said balance wheel is in its null position wherein the braking member is normally engaged with the balance wheel and is disengaged therefrom during the time that the thermally-actuated member is heated above a given temperature and wherein the winding mechanism includes a rotatable shaft to wind said spring, a moisture-proof casing to enclose said timer mechanism and thermal-actuating means, said casing being provided with an opening through which said shaft projects to the exterior of the casing, and sealing means to prevent entry of moisture through said opening.

References Cited in the file of this patent

UNITED STATES PATENTS

| | | |
|---|---|---|
| 1,678,139 | Tyler | July 24, 1928 |
| 1,894,015 | Bernstein | Jan. 10, 1933 |
| 2,574,583 | Nallinger | Nov. 13, 1951 |
| 2,705,048 | Wiley | Mar. 29, 1955 |
| 2,735,544 | Guyer | Feb. 21, 1956 |
| 2,749,703 | Schwaibold | June 12, 1956 |
| 2,845,173 | Langdon | July 29, 1958 |
| 2,951,332 | Piquerez | Sept. 6, 1960 |

FOREIGN PATENTS

| | | |
|---|---|---|
| 124,948 | Austria | Oct. 10, 1931 |
| 156,507 | Switzerland | Oct. 17, 1932 |